(12) United States Patent
Kanto et al.

(10) Patent No.: US 6,272,079 B1
(45) Date of Patent: Aug. 7, 2001

(54) OPTICAL HEAD UNIT FOR OPTICAL DISK APPARATUS HAVING BOTH FOCUS CONTROL AND TRACK CONTROL FUNCTION

(75) Inventors: Nobuyuki Kanto; Koichi Tezuka; Haruhiko Izumi; Satoshi Shimokawa; Shingo Hamaguchi; Akihiko Makita; Kyoko Tadaki; Kazushi Uno; Goro Kawasaki, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/203,158

(22) Filed: Dec. 1, 1998

(30) Foreign Application Priority Data

Jun. 30, 1998 (JP) ................................. 10-185283

(51) Int. Cl.$^7$ ........................................ G11B 7/00
(52) U.S. Cl. .................. 369/44.14; 369/112.24
(58) Field of Search .................... 369/44.11, 44.14, 369/44.15, 44.16, 44.17, 44.18, 44.19, 112, 44.23, 13, 112.23, 112.24

(56) References Cited

U.S. PATENT DOCUMENTS

| | | |
|---|---|---|
| 4,610,515 | 9/1986 | Tanaka . |
| 5,497,359 | 3/1996 | Mamin et al. ............... 369/44.15 |
| 5,712,842 | 1/1998 | Yamamoto et al. . |
| 6,104,675 | * 8/2000 | Hatam-Tabrizi ............. 369/112 X |
| 6,111,840 | * 8/2000 | Hajjar ....................... 369/44.23 X |

FOREIGN PATENT DOCUMENTS

| | | |
|---|---|---|
| 341829 | 11/1989 | (EP) . |
| 405742 | 1/1991 | (EP) . |
| 8212579 | 8/1996 | (JP) . |
| 8221790 | 8/1996 | (JP) . |

* cited by examiner

Primary Examiner—Paul W. Huber
(74) Attorney, Agent, or Firm—Greer, Burns & Crain, Ltd.

(57) ABSTRACT

An optical head unit used for an optical disk apparatus is provided. The optical head unit includes an object glass assembly for focusing a laser beam from a light source on an optical disk, an actuator movable at least in a focus control direction, a carriage for supporting the actuator and moving the actuator in a track control direction, and a slider which is attached to the carriage and capable of adjusting its posture in relation to a surface of the optical disk. The object glass assembly is provided with a plurality of lens units. Each lens unit includes at least one lens. One of the plural lens units is supported by the slider.

11 Claims, 9 Drawing Sheets

OPTICAL HEAD UNIT FOR OPTICAL DISK APPARATUS HAVING BOTH FOCUS CONTROL AND TRACK CONTROL FUNCTION

BACKGROUND OF THE INVENTION

1. Field of the Invention

The present invention relates to an optical head unit for an optical disk apparatus. In this specification, the phrase "optical disk apparatus" refers to a read-only device using an optical disk as well as to an magneto-optical disk apparatus capable of reading and writing data from and in a magneto-optical disk by magnetic field modulation or optical pulse modulation.

2. Description of the Related Art

Conventionally, optical disk apparatus have already been widely used as external mass storage devices for e.g. computers. Nowadays, in preparation for a full-fledged multimedia era to come in the future, a new technology is sought for producing an optical disk apparatus capable of operating with much higher recording density.

FIG. 9 illustrates principal parts of an optical head unit used for a conventional optical disk apparatus. An objective (1) is mounted on an actuator (not shown) for performing track control and/or focus control. The nonillustrated actuator is arranged to bring the objective (1) to a suitable position, so that the laser beam passing through the objective (1) will properly converge on a recording surface (r). As is shown, the recording surface (r) is attached to the upper side of a transparent platter of an optical disk (d). An element designated by reference character (h) is a magnetic head.

For increasing the recording bit density of the optical disk, it is possible to take the following measures: (a) utilization of a laser semiconductor as a light source that is arranged to emit a laser beam having a shorter wavelength; (b) utilization of an objective having a greater numerical number (NA); and (c) utilization of magnetic field modulation.

At present, the above option (a) is not practical since a laser semiconductor having a shorter wavelength (i.e., blue laser semiconductor) has several problems to be solved in respect to costs, output efficiency, thermal stability and so on.

Regarding the option (b), when use is made of only one objective for providing a relatively high NA, the radius of curvature of the objective should be small. However, such a lens is difficult to manufacture. Further, as the NA becomes greater, there will be an unfavorable increase in the coma-aberration (which is proportional to the third power of the NA) due to, for instance, tilt or eccentricity between the incidence plane and the exit plane of the objective, or due to tilt or eccentricity of the objective itself, or due to tilt of the optical disk. Further, spherical aberration (which is proportional to the fourth power of the NA) will also increase due to uneven thickness of the optical disk. With those aberrations present, it will be almost impossible to properly write and read data in and from the optical disk.

JP-A-8-221790 discloses an optical pickup apparatus which is proposed for dealing with the problems stated above. Referring to FIG. 10 of the accompanying drawings, the disclosed apparatus is provided with an object lens assembly including a first objective (11) and a second objective (12) each having a small NA. The second objective (12) is supported by a lens-barrel (m) of a serve-control actuator (a), while the first objective (11) is attached to a slider (s) which is supported by the lens-barrel (m) via an elastic member (b). In operation, the slider (s) will either be held in sliding contact with the bottom surface of a disk (d) or be caused to float away from the bottom surface of the disk (d) via an air layer.

According to the arrangements illustrated in FIG. 10, use is made of a combination of two objectives, i.e., the first and second objectives (11, 12) so that the overall NA of the object lens assembly is increased. As a result, it is possible to provide a higher recording density, while also overcoming the problems caused by using a single objective having a small radius of curvature. Further, the slider (s) can be held close to the bottom surface of the rotating disk (d) under action of the elastic member (b). In this manner, the coma-aberration due to the tilt of the disk (d) is prevented, while the wave aberration of the lens assembly being also eliminated. Thus, the writing and reading of data in relation to the disk (d) can be performed with a high bit density.

However, in the conventional optical pickup apparatus shown in FIG. 10, the slider (s) carrying the first objective (11) is attached to the mirror-barrel (m) of the actuator. Such an arrangement will give rise to the following disadvantages.

In general, when use is made of a two-dimensional actuator movable in a focus control direction (vertical direction) and a track control direction (horizontal direction), the actuator may be carried by a carriage (movable in a radial direction of an optical disk) via a support spring. Further, the actuator may be provided with a servomechanism having a focus coil and a track coil which are positioned in the magnetic field generated by a certain circuit mounted on the carriage. In such an arrangement, based on detected signals obtained from laser beams reflected on the recording surface of the optical disk, electric currents will be supplied to the track coil and/or the focus coil. Accordingly, the actuator will be moved in the track control direction and/or in the focus control direction for performing track control and/or focus control. In order to enable fast response for those control operations, it is preferable that the inertial mass of the actuator is rendered as small as possible, and that the rigidity of the support spring attached to the carriage is minimized.

However, according to the conventional optical pickup apparatus shown in FIG. 10, the actuator (a) carries the slider (s) via the elastic member (b), which unfavorably puts an additional weight onto the actuator (a). Another disadvantage is that a very complicated mass-spring system is formed between the carriage and the slider (s) when the slider (s) is elastically urged onto the disk (d). Regarding the first-mentioned disadvantage (unfavorable increase in weight), when the actuator (a) cannot be moved with sufficiently fast response, the floating and tilting extents of the slider (s) will unfavorably vary, which may produce a greater wave aberration. When this happens, high-density data writing and reading operations will become difficult to perform. At the same time, the driving performance of the actuator (a) will become unstable when even a slight error occurs in mounting the slider (s). Regarding the second-mentioned disadvantage (formation of a complicated mass-spring system), specifically, the carriage supports the actuator (a) via the support spring, the actuator in turn supports the slider (s) via the elastic member (b), and the slider (s) is associated in motion with the optical disk (d) via an air film when the disk is rotated. In such an arrangement, when the rotating disk (d) causes vibrations in the slider (s) due to the tilt and/or uneven thickness of the disk (d), the unsteady movement of the slider may lead to the resonance of the above mass-spring system. When this happens, the extent of the floating and/or tilting of the slider (s) in relation to the disk (d) tend to vary, and the wave aberration will become greater. In addition, the resonance mentioned above will render the focus control and the track control unreliable, whereby proper writing and reading operations with respect to the disk (s) will become difficult.

SUMMARY OF THE INVENTION

It is, therefore, an object of the present invention is to provide an optical head unit capable of overcoming the problems described above.

According to the present invention, there is provided an optical head unit used for an optical disk apparatus, the optical head unit comprising:

an object glass assembly for focusing a laser beam from a light source on an optical disk;

an actuator movable at least in a focus control direction;

a carriage for supporting the actuator and moving the actuator in a track control direction; and a slider which is attached to the carriage and capable of adjusting a posture thereof in relation to a surface of the optical disk;

wherein the object glass assembly comprises a plurality of lens units each including at least one lens, one of the plurality of lens units being supported by the slider.

According to a preferred embodiment, the remaining lens units other than said one of the plurality of lens units are supported by the actuator.

With such an arrangement, it is possible to increase the overall NA of the object glass assembly, while the NA of said one of the plurality of lens unit and the NA of the remaining lens units are kept small. In this manner, it is possible to provide a higher recording density with the use of separate objectives which are easy to manufacture. Further, since the slider can change its posture in relation to the surface of the optical disk, a possible coma-aberration caused by the tilt of the optical disk will advantageously be prevented. Still further, the actuator is movable in the focus control direction. Thus, the spherical aberration caused by an uneven thickness of the disk can be prevented by adjusting the distance between said one of the plurality of lens units and the remaining lens units.

According to the above embodiment, the slider is fixed to the carriage (not to the actuator). Thus, unlike the conventional apparatus shown in FIG. 10, no additional weight (inertial mass) will be put on the actuator, whereby the actuator can move swiftly enough. Further, according to the present invention, an external force, which may be caused due to the tilt or uneven thickness of the optical disk, will not be supplied to the actuator via the slider. In such an arrangement, the conventional problems (unwanted vibrations and resonance) are prevented from occurring. Thus, it is possible for the actuator to properly perform the focus control and track control. Still further, no complicated mass-spring system is formed in the optical head unit of the present invention. Thus, it is possible to prevent the lens unit, supported by the slider, from unduly tilting. In addition, the floating amount of the slider can be kept constant. As a result, the wave aberration will not become unduly greater.

As stated above, according to the present invention, an optical head unit is realized that makes it possible to prevent the occurrence of wave aberration and to stabilize the servomechanism of the actuator. Thus, with the use of the optical heat unit of the present invention, data can be written and read in and from an optical disk with a bit density higher than is conventionally possible.

According to the preferred embodiment, said one of the plurality of lens units and the remaining lens units are movable relative to each other, so that the focus control and/or track control are properly performed.

Specifically, the slider may be movable in the track control direction, so that said one of the plurality of lens units is moved relative to the remaining lens units in the track control direction.

The present invention is not limited to the above arrangement (wherein it is the slider that is moved). Alternatively, said one of the plurality of lens units and the remaining lens units may be moved relative to each other in the track control direction.

In the preferred embodiment, said one of the plurality of lens units and the remaining lens units are moved relative to each other in the focus control direction.

The actuator may be a one-dimensional device movable in the focus control direction. Alternatively, the actuator may be a two-dimensional device movable in the focus control direction and the track control direction.

According to another preferred embodiment, the laser beam is arranged to enter, at different angles, remaining lens units other than said one of the plurality of lens units, so that a beam spot of the focused laser beam is moved in the track control direction.

In the above embodiment, the optical head unit may further comprise a rotatable galvano-mirror for causing the laser beam to enter the remaining lens units at different angles.

The actuator may be a one-dimensional device movable in the focus control direction.

The slider may be arranged to float with respect to the optical disk when the optical disk is rotating, or the slider may be held in sliding contact with a surface of the optical disk.

The carriage may be a linearly movable carriage.

Alternatively, the carriage may be a swing arm type carriage which is pivotable about a vertical shaft.

The optical head unit may further comprise a magnetic head arranged opposite to the slider with respect to the optical disk.

In this case, the magnetic head and the slider may be urged toward the optical disk with a same force.

The optical disk may be made up of a transparent platter and a recording layer formed on the platter. In such an instance, the slider may be arranged on a side of the platter, whereas the magnetic head may be arranged on a side of the recording layer.

The transparent platter may have a thickness of about 0.6 mm.

Preferably, the object glass assembly may include an achromatic lens.

Other features and advantages of the present invention should become clear from the detailed description to be made hereinafter referring to the accompanying drawings.

DETAILED DESCRIPTION OF THE PREFERRED EMBODIMENT

The preferred embodiments of the present invention will be described below with reference to the accompanying drawings.

Figure 1:
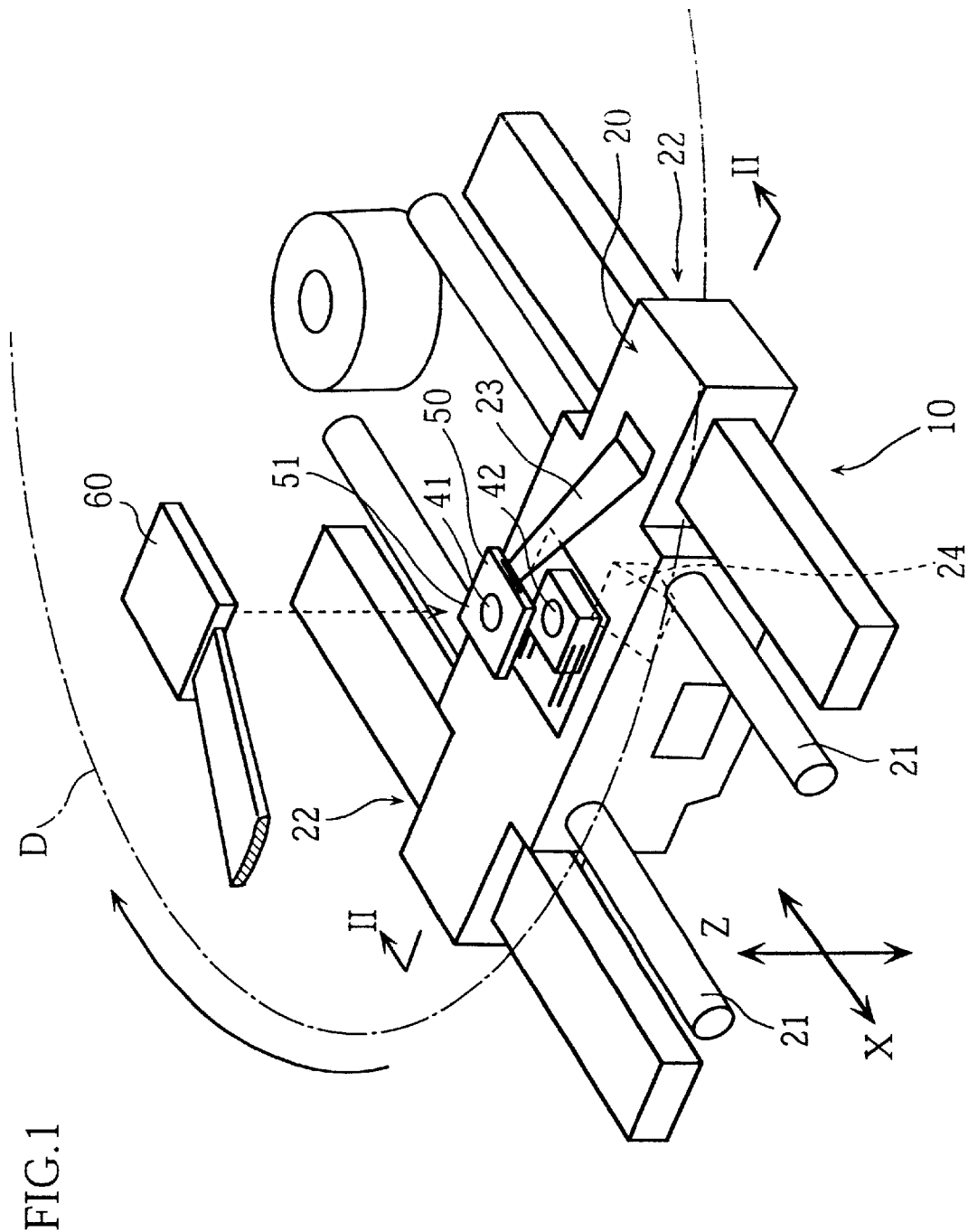
FIG. 1 is a perspective view showing an overall arrangement of an optical head unit according to a first embodiment of the present invention.
Figure 2:
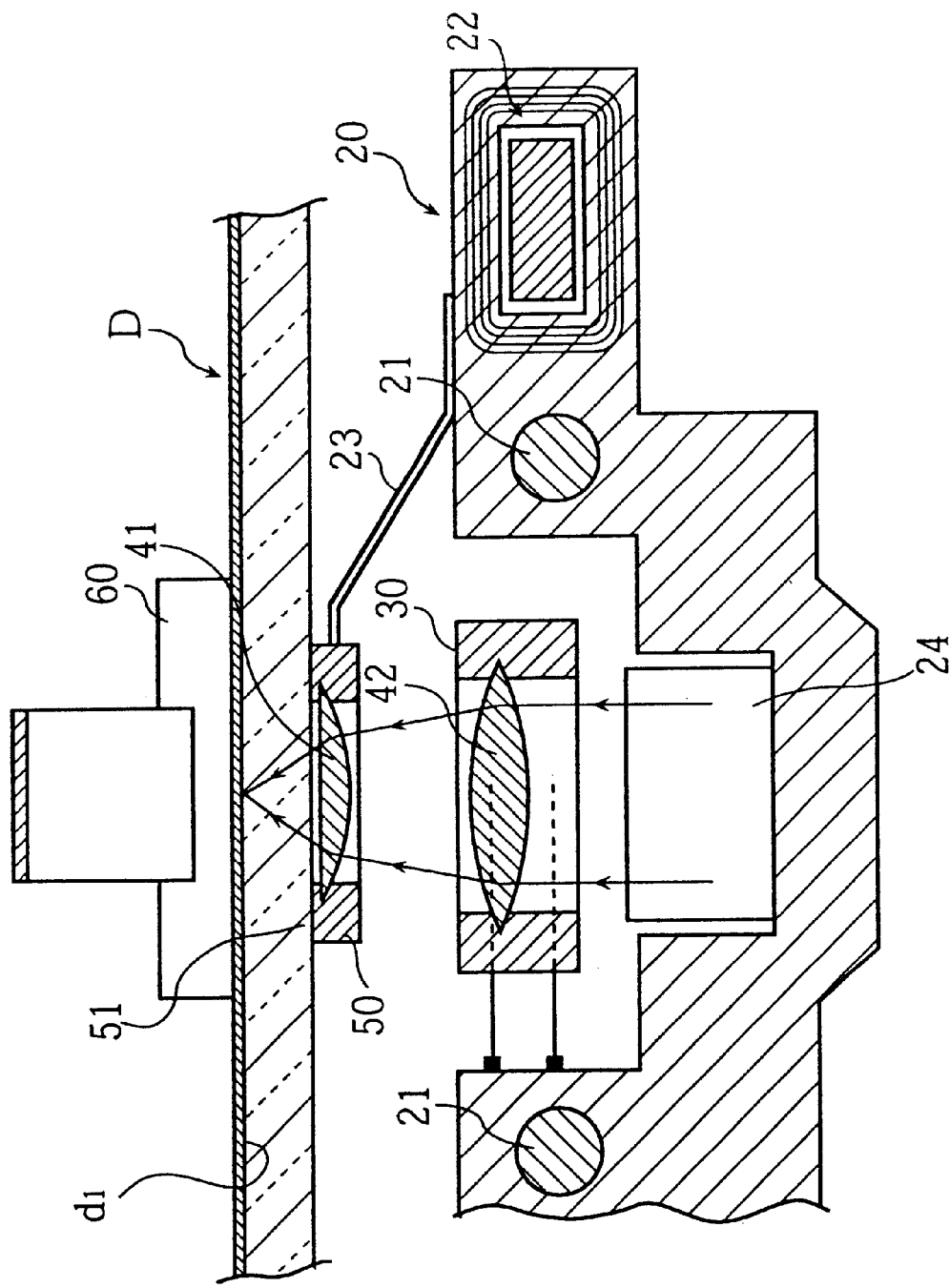
FIG. 2 is a sectional view taken along lines II—II in FIG. 1.

Reference is first made to FIGS. 1 and 2 which illustrate an optical head unit 10 for an optical disk apparatus according to a first embodiment of the present invention. As shown in FIG. 1, the optical head unit 10 includes a carriage 20 slidably supported by a pair of elongated guide members 21. The carriage 20 can be moved in the X-direction shown in FIG. 1 (called "track control direction" hereinafter) by a linear driving mechanism 22. The driving mechanism 22 may include a linear voice coil motor for example. As shown in FIG. 2, the carriage 20 supports an actuator 30 which in turn carries a lens (or lens unit) 42. The optical head unit 10 includes another lens (or lens unit) 41 supported by a slider 50. Together, the lens 41 (called "first objective" hereinafter) and the lens 42 (called "second objective") serve as an object lens system. In the illustrated embodiment, a single lens is used for each of the first and second objectives. However, two or more lens may be used for each objective unit. The actuator 30 is movable at least in the Z-direction shown in FIG. 1 (that direction will be called "focus control direction" hereinafter). Thus, by adjusting the vertical position of the actuator 30, the second objective 42 can be moved toward or away from the first objective 41. In this manner, the focus control of the object lens system can be performed. As is well known, for an optical head unit, both the focus control and the track control have to be performed. In this connection, when use is made of a two-dimensional actuator (i.e, movable in the track control direction and the focus control direction), the focus control and the track control will be performed by moving the actuator only.

The slider 50 is supported by the carriage 20 via a suspension member 23 such as a leaf spring. The slider 50 is a frame-like member formed with a central opening for accommodating the first objective 41. The upper surface 51 of the slider 50 is brought into slidable contact with the bottom surface of an optical disk D. As shown in FIG. 2, the first objective 41 is arranged above the second objective 42 in a coaxial manner. The vertical position of the slider 50 in relation to the carriage 20 is determined so that the suspension member 23 urges the slider 50 onto the optical disk D with a predetermined pressing force.

The first and the second objectives 41, 42 are designed to have a predetermined numerical aperture (NA) high enough for performing read/write operations with a desired high bit density. Below the second objective 42 is arranged a mirror 24 for directing light of an external light source to the second objective 42. The external light source may be a laser semiconductor. Emitted light or laser beams, after reflected on the mirror 24, will pass through the second objective 42 and the first objective 41. Converged by the two objectives, the laser beams will make a light spot on a recording surface d1 of the disk D.

The optical head unit 10 is provided with a magnetic head 60 which is brought into contact with the upper surface of the optical disk D at a location opposite to the slider 50. The magnetic head 60 is urged onto the optical disk D with a pressing force which is equal to the pressing force of the slider 50 (though in the opposite directions). The magnetic head 60 is arranged to write data in the disk D by magnetic field modulation. In order to perform magnetic field modulation properly (namely, without causing signals to be degraded due to dust accumulation on the disk D), it is necessary to give a certain distance (or thickness) between the laser-entering surface and data-recording surface of the optical disk. For providing the desired thickness, the illustrated disk D is made up of a relatively thick, transparent disk member and a recording film attached to one side of the disk member. The thickness of the disk D may be about 0.6 mm (the technical significance of that thickness will be described later).

With the above arrangement, when the disk D (attached to a spindle) is rotated, the slider 50 will slightly "float" over the bottom surface of the disk D via an air layer, or will be moved on the bottom surface of the disk in sliding contact therewith. In either case, the slider 50 can adjust its posture with respect to the disk D by following the movement of the disk D (the disk may unduly tilt during rotation and/or it may have an uneven thickness). In this manner, the posture of the first objective 41 with respect to the disk D can be automatically adjusted.

As previously stated, the second objective 42 can be vertically moved since it is supported by the actuator 30 which is movable toward and away from the disk D. By changing the vertical position of the second objective 42, the laser beams can be converged on different points as viewed in the thickness direction of the disk D. In this way, the focus control of the object lens system is performed.

The positional adjustment of the second objective 42 may be performed in a conventional manner. Specifically, laser beams reflected on the recording surface of the disk D are split by a beam splitter and part of the reflected light is detected by a suitable detector. Then, based on data obtained from the detected light, a servomechanism will adjust the vertical position of the actuator 30.

When the actuator 30 is capable of performing two-dimensional operation, the second objective 42 supported by it will also be moved in the track control direction (relative to the first objective 41). In this way, the beam spot of the converged laser beams can be shifted in the track control direction for performing desired track control. Like the focus control previously described, the track control can also be performed in a conventional manner (i.e, with the use of a detector for detecting the light reflected on the recording surface of the disk D and a servomechanism for controlling the actuator 30 based on data obtained from the detected beams).

When the actuator 30 is a one-dimensional device designed to move only in the focus control direction, use may be made of a galvano-mirror in place of the illustrated mirror 24 (FIG. 2). In this case, the galvano-mirror may be arranged to pivot about a horizontal axis, so that the direction of laser beams reflected on the galvano-mirror will be altered in the track control direction by adjusting the posture of the mirror about the horizontal axis.

According to the optical head unit 10 of the present invention, the slider 50 is arranged to adjust its posture in relation to the disk surface. Thus, the coma-aberration due to the tilt of the disk D is advantageously prevented. Further, the distance between the first and second objectives 41, 42 is changed by moving the actuator 30 in the focus control direction. Thus, it is also possible to prevent the spherical aberration due to the uneven thickness of the disk D.

Further, according to the illustrated optical head unit 10, the slider 50 carrying the first objective 41 is supported by the carriage 20 but not by the actuator 30. Therefore, no additional weight (or inertial mass) will be put on the actuator. Such an arrangement is advantageous for enabling the actuator 30 to move quickly enough. Further, an external force due to the tilt of the disk D or uneven thickness thereof will not be applied to the actuator via the slider 50. Thus, the focus control and/or the track control by the actuator 30 can be reliably performed. Still further, no complicated mass-spring system (including the carriage 20, the actuator 30, the slider 50 and the disk surface) is produced. Thus, it is possible to prevent the slider 50 (hence the first objective 41) from unduly tilting. In addition, when there is no complicated mass-spring system, the slider 50 can keep floating in a constant position without being brought too closer to or away from the bottom surface of the disk D. Thus, the wave aberration is advantageously reduced or even eliminated.

Still further, according to the illustrated optical head unit 10, the disk D is urged from above and from below with an equal pressing force by the magnetic head 60 (which may include a slider carrying a coil) and the slider 50. Thus, the disk D will not be warped or displaced in the thickness direction by the slider 50. As a result, the focus control and/or the track control can be performed reliably enough.

Figure 3:
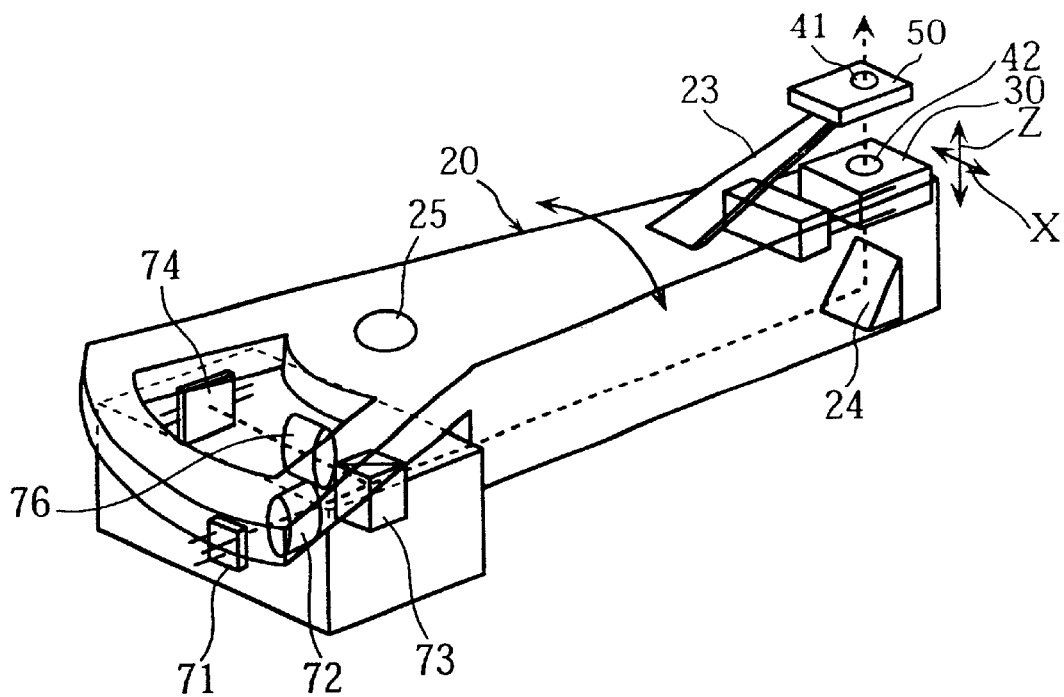
FIG. 3 is a perspective view showing an overall arrangement of an optical head unit according to a second embodiment of the present invention.

Reference is now made to FIG. 3 showing an optical head according to a second embodiment of the present invention. In the figure, members or elements similar to those of the first embodiment (FIGS. 1 and 2) are designated by the same reference numbers or characters.

The optical head 10 of the second embodiment includes a swing arm type carriage 20 for moving an actuator 30 in a track control direction or X-direction shown in FIG. 3. The swing arm 20 is attached to a vertical shaft 25, so that it can rotate about the vertical axis of the shaft. As can be seen from FIG. 3, the elongated swing arm 20 has two ends, one of which (base end) is closer to the shaft 25 while the other (distal end) farther away from the shaft 25. In operation, the distal end of the swing arm 20 will trace out an arc extending across a recording region of the disk D substantially in the radial direction of the disk.

The distal end of the swing arm 20 carries a two-dimensional actuator 30 movable both in the focus control direction (Z-direction) and in the track control direction. The actuator 30 supports a second objective 42 which has an optical axis extending in the focus control direction. The swing arm 20 supports a slider 50 via a leaf spring suspension member 23. The slider 50 carries a first objective 41 whose optical axis coincides with that of the second objective 42. The suspension member 23 has a lower end fixed to an intermediate portion of the upper surface of the swing arm 20. From that lower end, the suspension member 23 extends upwardly and away from the shaft 25.

Below the base end of the swing arm 20, there are provided a laser semiconductor 71 as a light source, a collimator lens 72, a servo-lens 76, a beam splitter 73 and a detector 74. The laser beams emitted by the laser semiconductor 71 will pass through the lens 72 and the beam splitter 73. Thereafter, the laser beams travel longitudinally of the swing arm 20 and are reflected on a mirror 24 toward the second objective 42. Then, while passing through the second and the first objectives 42, 41, the reflected beams are converged to make a light spot on the recording surface of the disk D. Thereafter, the laser beams reflected on the recording surface of the disk D will trace back the same path toward the beam splitter 73. In the beam splitter, the laser beams are split into two parts, and one of them passes through the servo-lens 76 and is detected by the detector 74. Like in the first embodiment, the actuator 30 performs the focus control and the track control based on data obtained from the detected beams.

In the optical head 10 of the second embodiment, use is made of two separate objectives, namely, the first and the second objectives 41, 42. Like in the first embodiment, the first objective 41 is supported by the slider 50 which is attached to the carriage 20, while the second objective 42 is carried by the actuator 30. Thus, according to the second embodiment again, it is possible to obtain the same advantages as described with the first embodiment.

Figure 4:
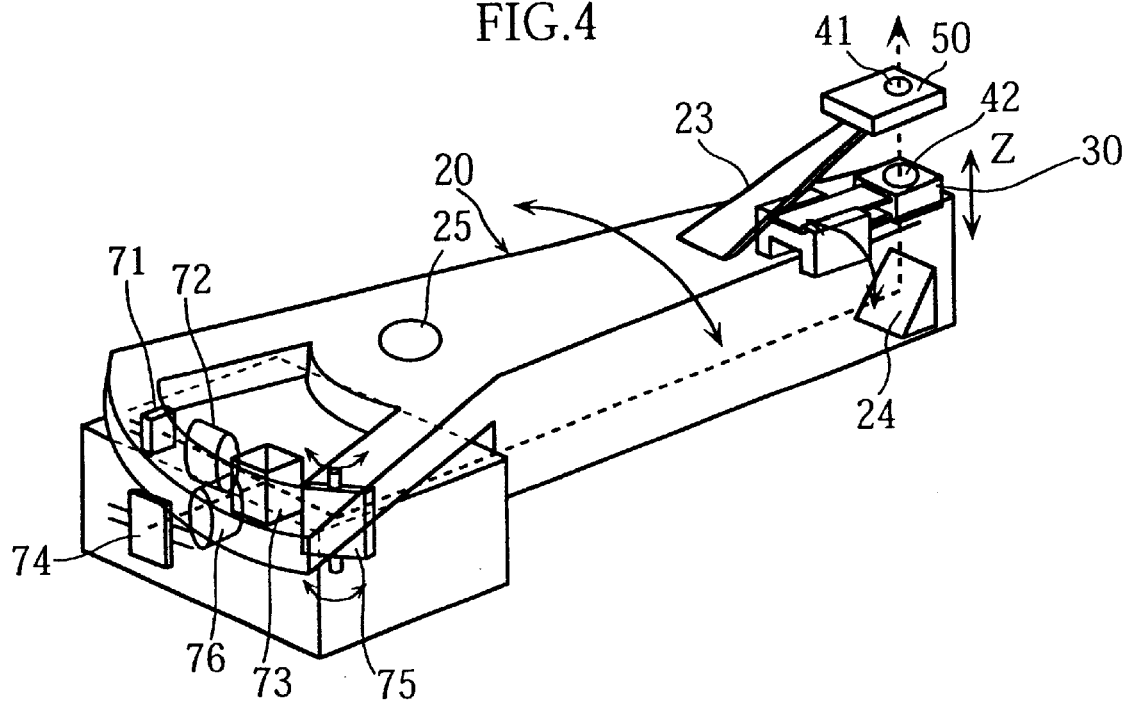
FIG. 4 is a perspective view showing an overall arrangement of an optical head unit according to a third embodiment of the present invention.

Reference is now made to FIG. 4 showing an optical head unit according to a third embodiment of the present invention. In the figure, members or elements similar to those of the first embodiment are designated by the same reference characters or numerals.

Like in the second embodiment, the optical head unit of the third embodiment includes a swing arm type carriage 20. However, the track control operation by the third embodiment is different from that of the second embodiment. Specifically, the swing arm 20 has two ends, namely, a base end closer to the shaft 25 and a distal end opposite to the base end. The distal end of the swing arm 20 carries an actuator 30 which is a one-dimensional device movable only in the focus control direction. In this arrangement, the actuator 30 of the third embodiment performs focus control only. On the other hand, below the base end of the swing arm 20, there is provided a galvano-mirror 75. As can be seen from FIG. 4, the galvano-mirror 75 is attached to a vertical shaft which is arranged to rotate about its vertical axis. Thus, the galvano-mirror 75 is pivotable with the vertical shaft, as illustrated in FIG. 4. With such an arrangement, laser beams emitted from a laser semiconductor 71 are reflected on the galvano-mirror 75 and then travel toward the distal end of the swing arm 20. At this stage, when the galvano-mirror 75 is caused to pivot, the laser beams reflected by the mirror 75 will be swayed horizontally in the swing arm carriage 20. As a result, the beam spot produced by the object lens system (i.e. the combination of the first and second objectives 41, 42) will be moved in the track control direction for performing the track control. The other arrangements are similar to those of the second embodiment, and no description is given here.

In the optical head unit 10 of the third embodiment again, use is made of two separate objectives, namely, the first objective 41 and the second objective 42. The former is supported by the slider 50 which is carried by the carriage 20, while the latter is carried by the actuator 20. Therefore, according to the third embodiment again, it is possible to obtain the same advantages as described with the first embodiment.

Figure 5:
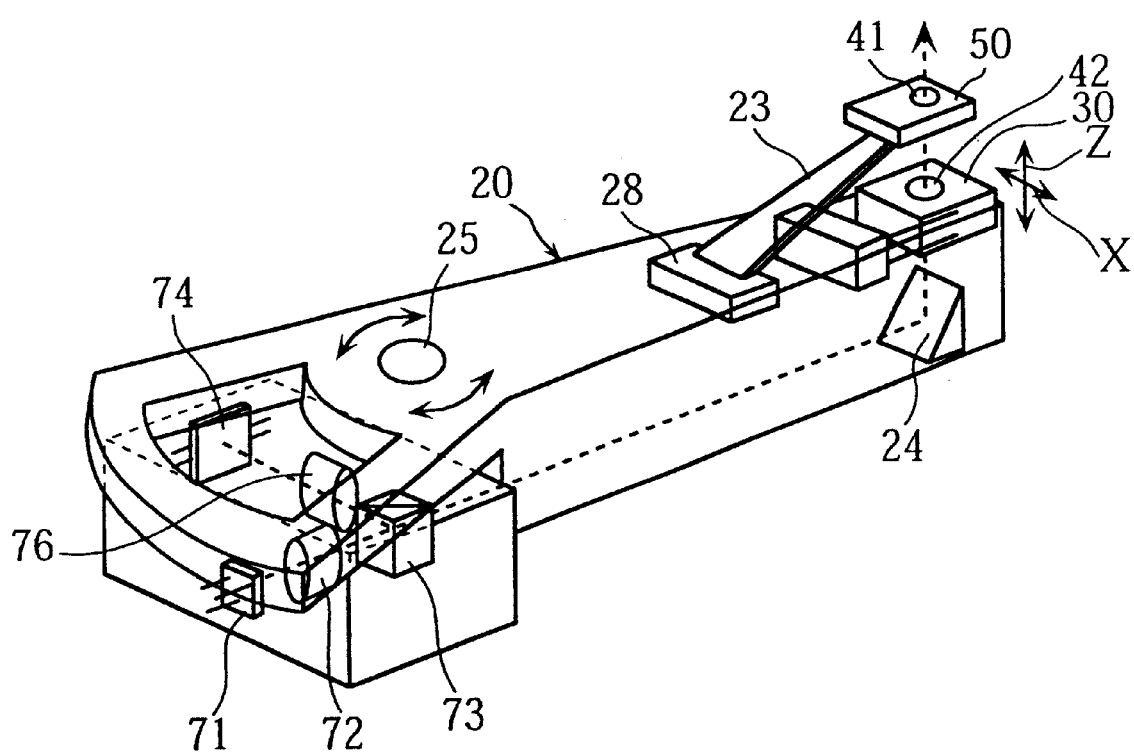
FIG. 5 is a perspective view showing an overall arrangement of an optical head unit according to a fourth embodiment of the present invention.

Reference is now made to FIG. 5 showing an optical head unit according to a forth embodiment of the present invention. In the figure, members or elements similar to those of the first embodiment are designated by the same reference numbers or characters.

The optical head unit of the fourth embodiment is basically similar to that of the third embodiment described above, except that the former (fourth embodiment) is provided with an additional driving unit 28 which is not used in the third embodiment. Specifically, the optical head unit of the fourth embodiment is provided with a slider 50 for holding a first objective 41. The slider 50 is mounted on the upper end of a suspension member 23. The lower end of the suspension member 23 is fixed to the driving unit 28. This driving unit is capable of swaying the suspension member 23 in the X-direction or in the track control direction. In this manner, the first objective 41 can be shifted with respect to the second objective 42 in the track control direction, so that desired track control is performed. The arrangements around the base end of the swing arm 20 are similar to those of the second embodiment shown in FIG. 3, while the arrangements around the distal end of the swing arm 20 are similar to those of the third embodiment shown in FIG. 4 except for the driving unit 28.

In the optical head unit 10 of the fourth embodiment again, use is made of two separate objectives, namely the first objective 41 and the second objective 42. The former is supported by the slider 50 which is carried by the carriage 20, while the latter is carried by the actuator 20. Therefore, according to the fourth embodiment again, it is possible to obtain the same advantages as described with the first embodiment.

As the NA (numerical aperture) of an objective increases, the wave aberration due to the tilt or uneven thickness of a disk will become greater. In general, when the thickness of the disk is made smaller, the wave aberration will be reduced. At the same time, as the disk is reduced in thickness, tiny particles (such as dust) adhered to the disk surface may make it more difficult to read out data from the disk properly (degradation of read-out signals).

In a DVD (Digital Video Disc) apparatus, for instance, use may be made of an objective whose NA is 0.6, and therefore the thickness of the disk is set to 0.6 mm. When manufacturers intend to give the objective a greater NA, they may think that it is necessary for the disk thickness to be smaller than 0.6 mm.

Figure 6:
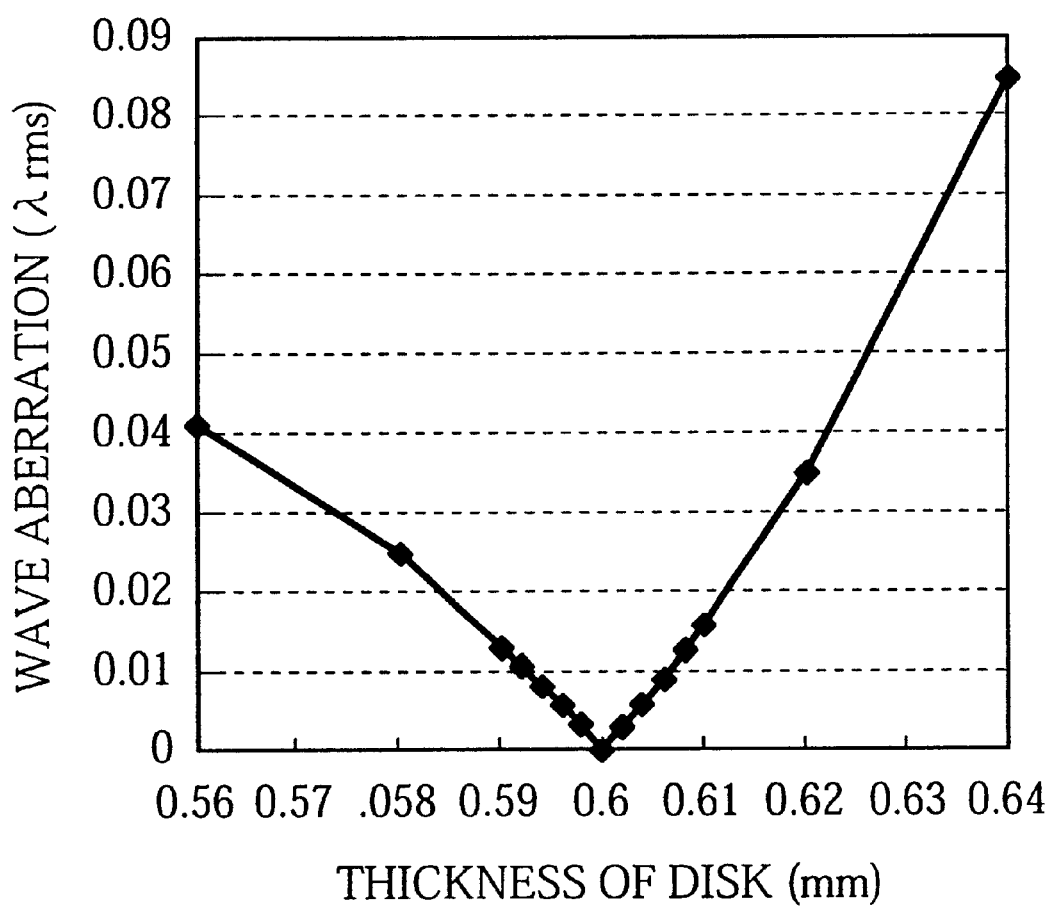
FIG. 6 is a graph showing a relationship between the disk thickness and the wave aberration.

In that connection, the inventors conducted an experiment using an optical head unit of the present invention, wherein the overall NA (i.e., a combination of the NAs of the first and second objectives 41, 42) was 0.85. In that experiment, calculation was made to find minimum values of the wave aberration against various disk thicknesses when the second objective 42 mounted on the actuator 30 was defocused. The results were shown in FIG. 6. According to a certain criterion, an acceptable wave aberration should not be more than 0.07 $\lambda$. Thus, as can be seen from FIG. 6, when the disk thickness is 0.6 mm, the acceptable thickness variation (in the increasing direction of thickness) is 30 $\mu$m, which is sufficiently large. This means that even when the NA is 0.85, use can be made of an optical disk having a thickness of 0.6 mm (and maybe more).

In general, focus control methods utilized for an optical disk apparatus include an astigmatism method and a Foucault method. In an optical head unit according to the present invention, the focus control is performed as follows. When the second objective 42 is brought unduly closer to the slider 50 and the disk D, the reflected light of the originally parallel laser beams tends to diverge. On the other hand, when the second objective 42 is brought unduly farther away from the slider 50 and the disk D, the reflected light will converge excessively. Such erroneous results are detected by the detector 74, and necessary corrections are made so that the laser beams will always converge on the recording surface of the disk D.

Figure 7:
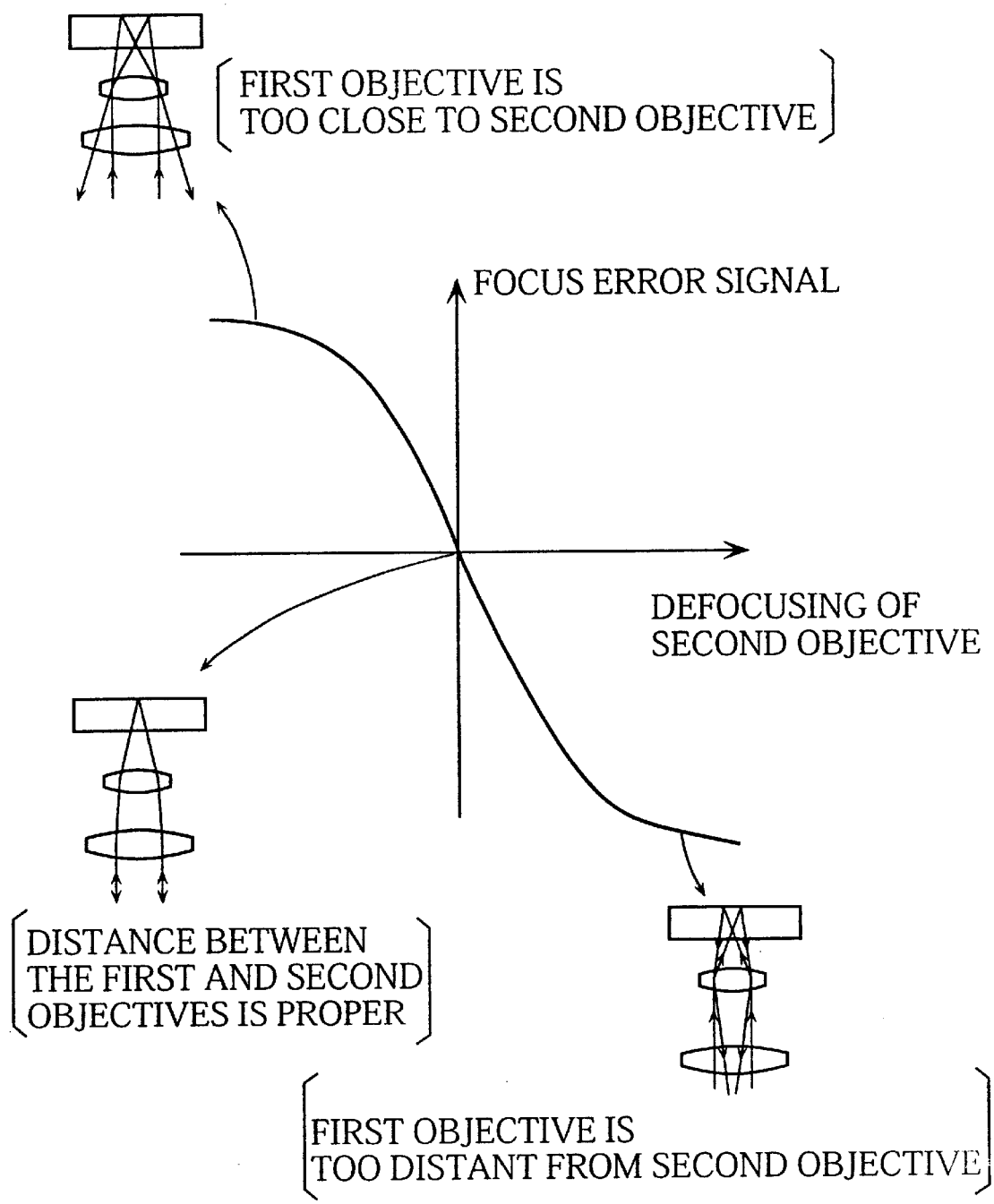
FIG. 7 illustrates a relationship between the defocus amount of a second objective and the focus error signal.

For performing the focus control described above, it is assumed that a focus error signal becomes zero (0) when the focus is properly adjusted, as shown in FIG. 7. Thus, the focus control will be performed so that the focus error signal will become zero. However, when the NA of the object lens system is increased, the effect of the spherical aberration due to the thickness or unevenness of the thickness will become greater. Thus, there is no guarantee that the spherical aberration will be minimized when the focus error signal becomes zero.

Figure 8:
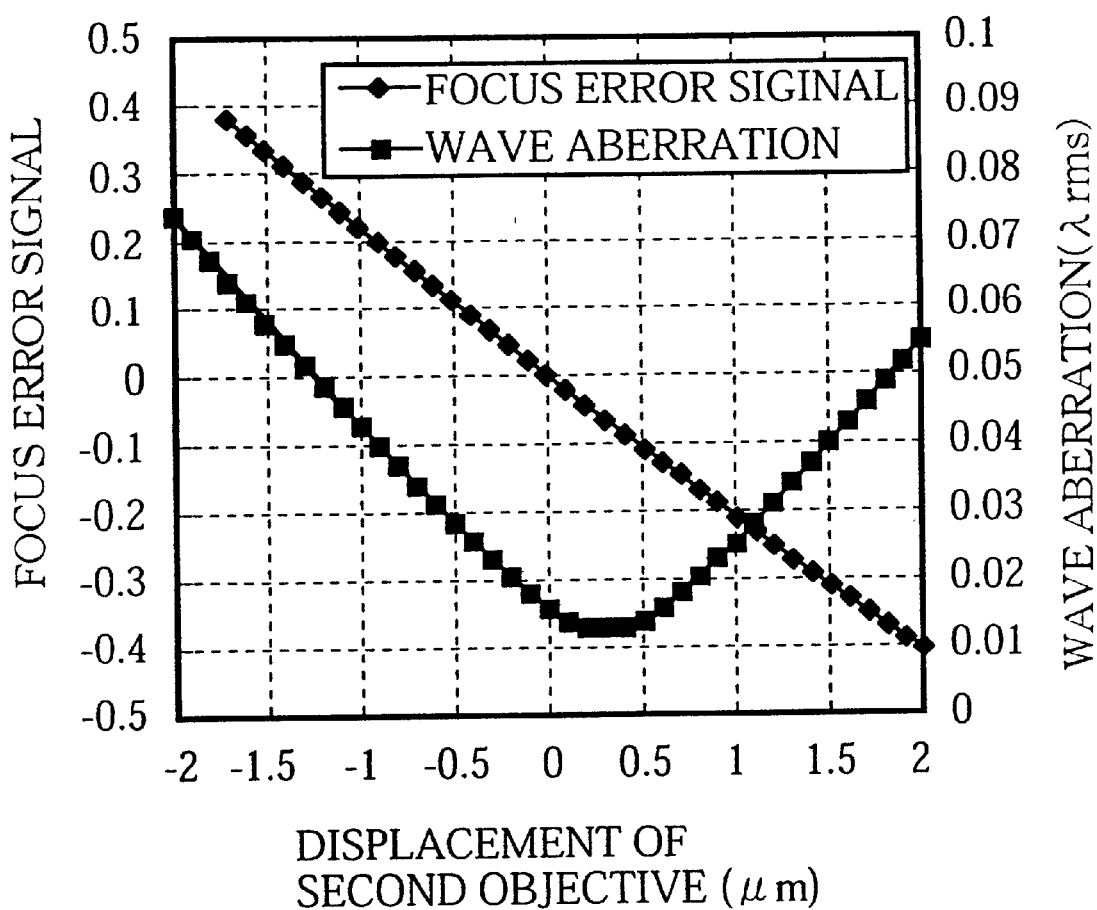
FIG. 8 is a graph showing a relationship between the displacement of the second objective and the focus error signal, and a relationship between the same displacement and the wave aberration.
Figure 9:
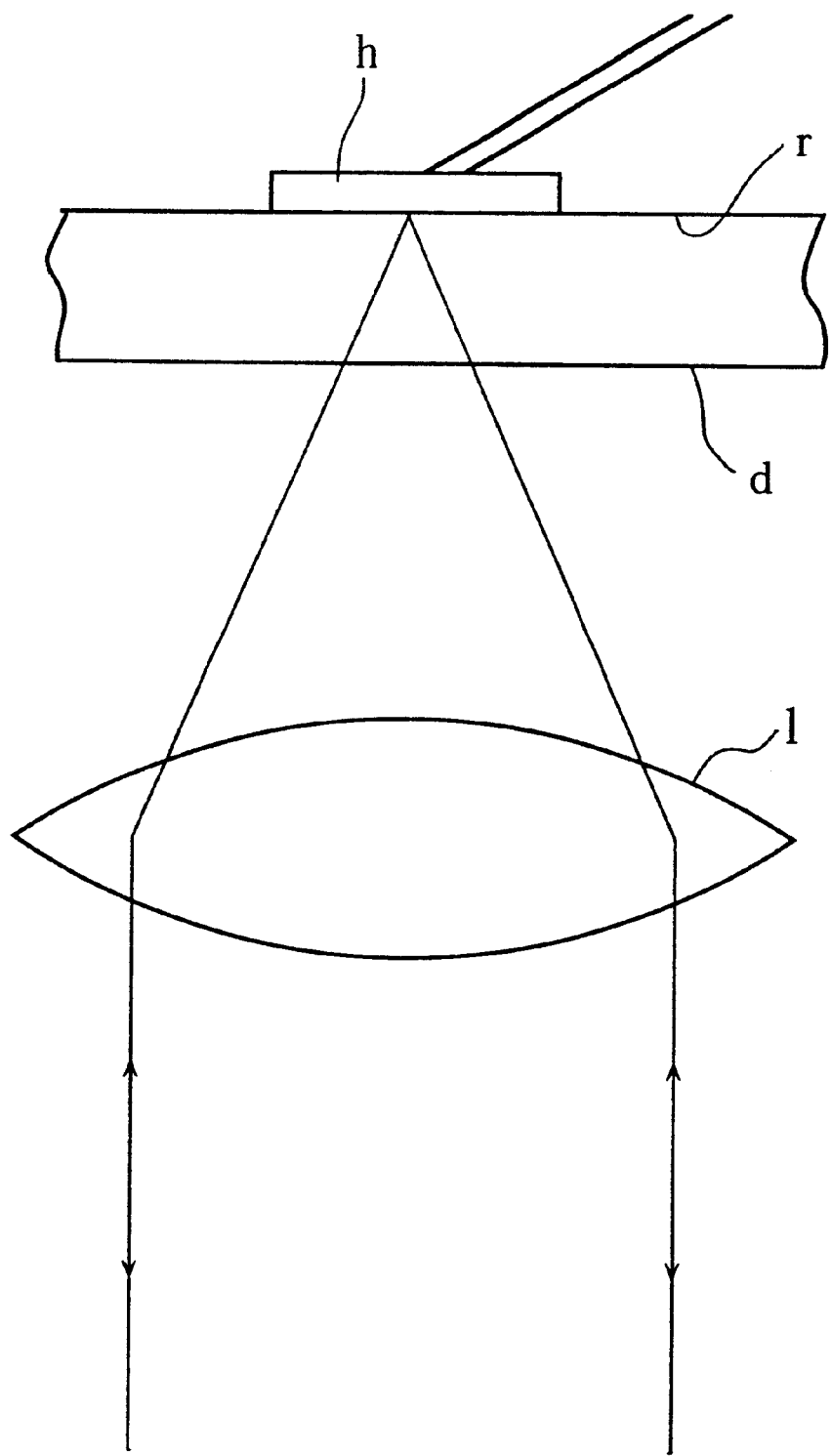
FIG. 9 illustrates a conventional optical head unit.
Figure 10:
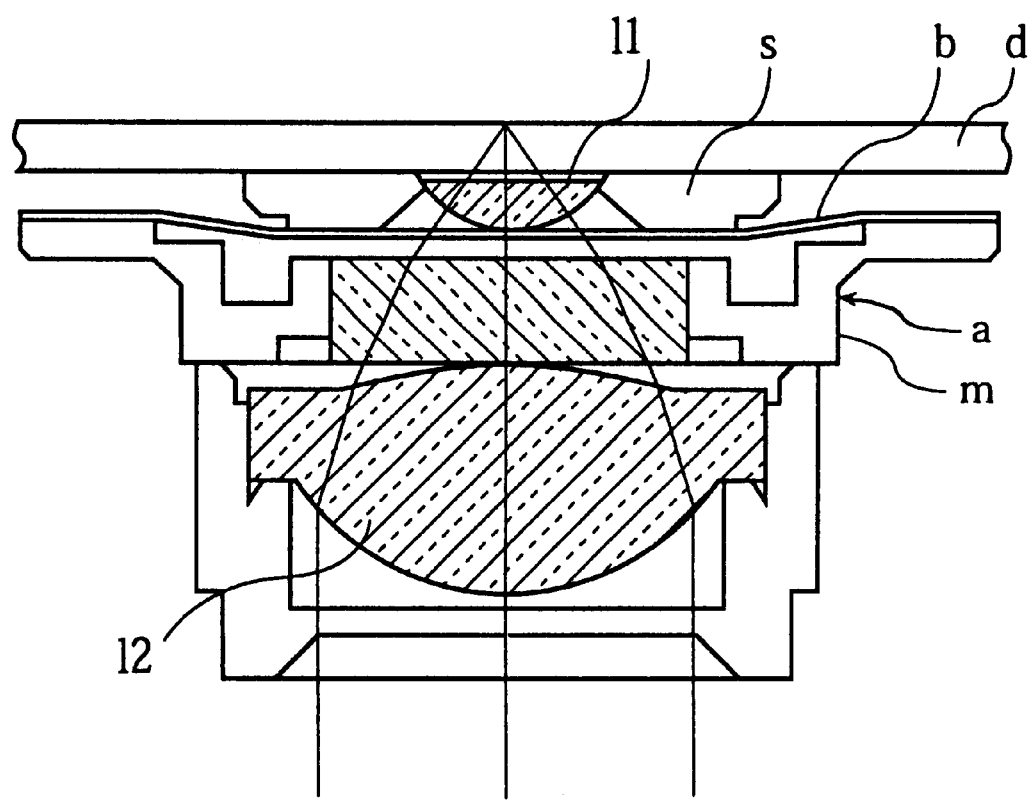
FIG. 10 illustrates arrangements of another conventional optical head unit.

In that connection, with the use of the optical head unit described above (i.e., the NA is 0.85 and the disk thickness is 0.6 mm), the inventors made calculations for finding values of the focus error signal and wave aberration when the second objective 42 was defocused. The results are shown in FIG. 8. As can be seen from the figure, the point at which the focus error signal becomes zero is substantially the same as the point at which the wave aberration is minimal. This means that, according to the present invention, it is possible to perform the focus control and prevent the wave aberration, by adjusting the second objective 42 in the focus control direction.

The wavelength of laser beams emitted by a laser semiconductor will be varied depending on temperature. When, the wavelength shifts, the coefficient of refraction of the respective objectives also varies. (When the wavelength of the laser beams becomes shorter for example, these laser beams will be caused to converge at a point closer to the objective.) As a result, upon shifting of the wavelength, the focusing point will be unfavorably displaced, thereby increasing the wave aberration. In such an instance, writing and reading of data in and from the disk will not be properly performed. In order to overcome this problem, use may be made of a first and a second objectives having different dispersing properties. With the use of such objectives in combination, even when the semiconductor laser beams converge at an unfavorably early stage due to becoming shorter in wavelength, it is possible to cause the improperly converged laser beams to diverge at an earlier stage. Thus, by adjusting the dispersing performance of each objective, it is possible to cancel out the convergence and divergence of the laser beams (achromatic effect). Alternatively, use may be made of a combination of two lenses having different dispersing properties for each of the first and second objectives 41, 42. Still further, it is also possible to use a combination of a converging lens and a diverging lens for the first objective 41 and/or the second objective 42. In this manner, the achromatic effect is also obtained. In addition or alternatively, the surface of a lens may be provided with a diffraction grating for correcting the displacement of the focusing point caused by the shift in wavelength of the laser beams.

In the preferred embodiments described above, two separate lenses (or lens units) 41, 42 are used. (More than one lens may be used in combination for each of the illustrated objectives 41, 42.) However, it is also possible to use three or more separate objectives. In such an case, at least one of the objectives will be carried by the slider 50.

The present invention being thus described, it is obvious that the same may be varied in many ways. Such variations should not be regarded as a departure from the spirit and scope of the present invention, and all such modifications as would be obvious to those skilled in the art are intended to be included within the scope of the following claims.

What is claimed is:

1. An optical head unit used for an optical disk apparatus, the optical head unit comprising:

an object lens assembly for focusing a laser beam from a light source on an optical disk;

an actuator movable at least in a focus control direction;

a carriage for supporting the actuator, the carriage being movable in a track control direction; and a slider which is attached to the carriage and capable of adjusting a posture thereof in relation to a surface of the optical disk;

wherein the object lens assembly comprises a first lens supported by the slider, and a second lens supported by the actuator; and wherein the actuator is a two-dimensional device movable in the focus control direction and the track control direction relative to the slider.

2. The optical head unit according to claim 1, wherein the slider is arranged to float with respect to the optical disk when the optical disk is rotating.

3. The optical head unit according to claim 1, wherein the slider is held in sliding contact with a surface of the optical disk.

4. The optical head unit according to claim 1, wherein the carriage is a linearly movable carriage.

5. The optical head unit according to claim 1, wherein the carriage is a swing arm type carriage.

6. The optical head unit according to claim 1, further comprising a magnetic head arranged opposite to the slider with respect to the optical disk.

7. The optical head unit according to claim 6, wherein the magnetic head and the slider are urged toward the optical disk with a same force.

8. The optical head unit according to claim 6, wherein the optical disk includes a transparent platter and a recording layer formed on the platter, the slider being arranged on a side of the platter, the magnetic head being arranged on a side of the recording layer.

9. The optical head unit according to claim 1, wherein the optical disk includes a transparent platter having a thickness of about 0.6 mm and a recording layer formed on the platter, the object lens assembly being arranged to cause the laser beam to properly converge on the recording layer of the optical disk.

10. The optical head unit according to claim 1, wherein the object lens assembly includes an achromatic lens.

11. A magneto-optical disk apparatus for reading and writing with respect to an optical disk which has a recording layer only on one side of the disk, the apparatus comprising:

a magnetic head urged against said one side of the disk, a slider urged against the opposite side of the disk in corresponding positional relationship to the magnetic head;

a first lens supported by the slider;

an actuator movable at least in a focus control direction relative to the slider;

a second lens supported by the actuator; and a carriage for supporting the slider and the actuator for movement in a track control direction.

* * * * *